United States Patent [19]

Caputo

[11] Patent Number: 4,717,865
[45] Date of Patent: Jan. 5, 1988

[54] TRANSPORTATION APPARATUS

[75] Inventor: William R. Caputo, Wyckoff, N.J.

[73] Assignee: Westinghouse Electric Corp., Pittsburgh, Pa.

[21] Appl. No.: 55,582

[22] Filed: May 29, 1987

[51] Int. Cl.$^4$ .................. B60T 13/04; H02P 3/04
[52] U.S. Cl. ..................... 318/362; 188/171; 198/854
[58] Field of Search ............ 318/362, 370, 372; 188/171; 198/321, 323, 330, 854, 855

[56] References Cited

U.S. PATENT DOCUMENTS

| | | | |
|---|---|---|---|
| 3,416,053 | 12/1968 | Inba et al. | 188/171 X |
| 4,231,452 | 11/1980 | Kraft | 198/854 X |
| 4,588,065 | 5/1986 | Maiden et al. | 198/323 |
| 4,600,865 | 7/1986 | Caputo | 318/63 X |

FOREIGN PATENT DOCUMENTS

54-33484  3/1979  Japan ..................... 198/323

Primary Examiner—Bentsu Ro
Attorney, Agent, or Firm—D. R. Lackey

[57] ABSTRACT

Transportation apparatus, such as escalators and moving walks, having an electrically released, magnetically set brake, and a servo loop for regulating the brake coil current. Brake voltage and brake current feedback are both used in the regulation of the brake current, with the values of the voltage and current feedback being selected to cause electromagnetic flux produced by the brake coil current to substantially cancel the magnetic flux produced by permanent magnets over the operating temperature range of the brake. In a preferred embodiment of the invention, the brake current is pulsed continuously while the transportation apparatus is operated, to prevent transient excursions of the brake current from initiating and maintaining partial setting of the brake.

14 Claims, 14 Drawing Figures

TRANSPORTATION APPARATUS

BACKGROUND OF THE INVENTION

1. Field of the Invention

The invention relates in general to transportation apparatus, such as escalators and moving walks, and more specifically to transportation apparatus having an electrically controlled brake.

2. Description of the Prior Art

My U.S. Pat. No. 4,600,865, entitled Transportation Apparatus, which issued July 15, 1986, describes and claims transportation apparatus in which deceleration is directly controlled when such apparatus is stopped. The direct control of deceleration includes a deceleration servo loop which provides a current signal for an inner current loop which regulates brake current to cause the transportation apparatus to stop at a predetermined constant deceleration rate. In one embodiment of the invention set forth in my U.S. patent, the running brake current, i.e., the brake current prior to the initiation of a controlled stop, is also included in the servo loop, and regulated to a predetermined constant value. It was felt that by regulating the running brake current to a constant value, the brake would always be fully lifted when the transportation apparatus was in its normal running mode, compensating for brakes which were sensitive to brake temperature and supply voltage variations.

Actual experience with an escalator having an electrically controlled brake constructed as set forth in my U.S. patent has proven that partial setting of the brake can still occur during normal running conditions, notwithstanding regulating the brake running current to a constant value.

SUMMARY OF THE INVENTION

Briefly, the present invention relates to new and improved transportation apparatus, and methods of operating same, in which a brake is electrically controlled, to permit controlled stops as set forth in the hereinbefore mentioned U.S. patent. Further, the running brake current is controlled to prevent partial setting or "dragging" of the brake during normal operation of the apparatus.

Instead of regulating the running brake current to a predetermined constant value, the running brake current is regulated to provide an electromagnetic flux which substantially cancels magnetic flux provided by permanent magnets in the brake, notwithstanding a magnetic flux value which changes with brake temperature. In addition to the expected change in the resistance of the brake coil with brake temperature, the permanent magnets, which set the brake in the absence of a cancelling electromagnetic flux produced by the brake coil, were found to provide a declining value of magnetic flux with increasing brake temperature. In the present invention, the running brake current is regulated to always provide the required cancelling magnitude of electromagnetic flux at any temperature over the operating temperature range of the brake, by providing brake voltage feedback as well as brake current feedback. The values of the brake voltage feedback and the brake current feed back are selected to provide a ratio which causes the brake current to change with brake temperature according to the change in magnetic flux provided by the brake magnets.

If the brake current is precisely regulated according to the brake voltage and brake current feedback, the brake will always fully recover from a brake current transient which causes momentary dragging of the brake. The range of the brake current versus brake temperature which will permit full recovery, however, is relatively narrow, making the adjustment of the brake controller somewhat critical. In a preferred embodiment of the invention, this range of brake current is widened, significantly reducing the criticality of setting the feedback values, by pulsing the brake current during normal running conditions. The brake current pulsing, which does not change the average brake current, and which is terminated at the start of a controlled stop of the apparatus, allows the average brake current to be outside the critical narrow range. The pulse magnitude is selected such that a non-critical setting of the feedback ratio will always cause a brake current pulse to intersect the narrow critical range of brake current. Thus, the brake will always fully lift after each transient excursion of the brake current into a brake current range which causes partial setting or dragging of the brake.

A further improvement is provided by relating the initial brake current pulse to initial release of the brake upon start up of the transportation apparatus, to always drive the brake current through the narrow critical brake release range with the first brake pulse. This results in the initial release of the brake being faster and with less drag than it would be without brake pulsing, or with a brake pulsing arrangement which does not control the initial pulse.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

Figure 1:
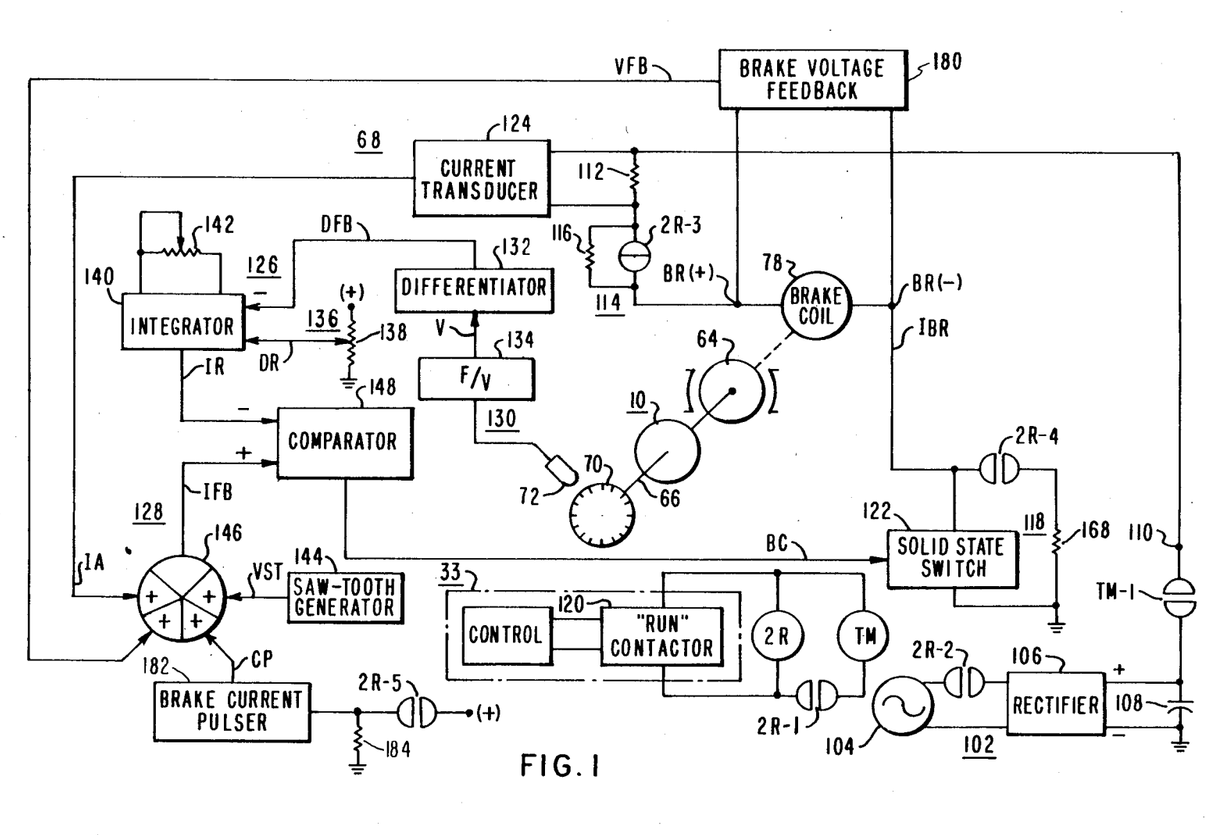
FIG. 1 is a schematic diagram of a brake controller for transportation apparatus constructed according to the teachings of the invention.

In order to limit the length of the present application, the hereinbefore mentioned U.S. Pat. No. 4,600,865 is hereby incorporated into the present application by reference. FIG. 1 of the present application is similar to FIG. 6 of the incorporated patent, except modified to illustrate the teachings of the invention. In general, FIG. 6 of the incorporated patent has been modified to provide:

(a) a brake voltage feedback function 180 which receives a voltage from brake terminals BR(+) and BR(−) and provides a signal VFB for mixer 146, and (b) a brake current pulsing function 182 which receives a signal RS which is at the logic one level when the associated transportation apparatus 10 is running, and which is at the logic zero level when transportation apparatus 10 is not running. For example, signal RS may be provided by a normally open contact 2R-5 of running relay 2R, a positive source of unidirectional potential, and a resistor 184. Brake current pulser 182 provides a square wave signal CP to mixer 146 while apparatus 10 is running.

Figure 2:
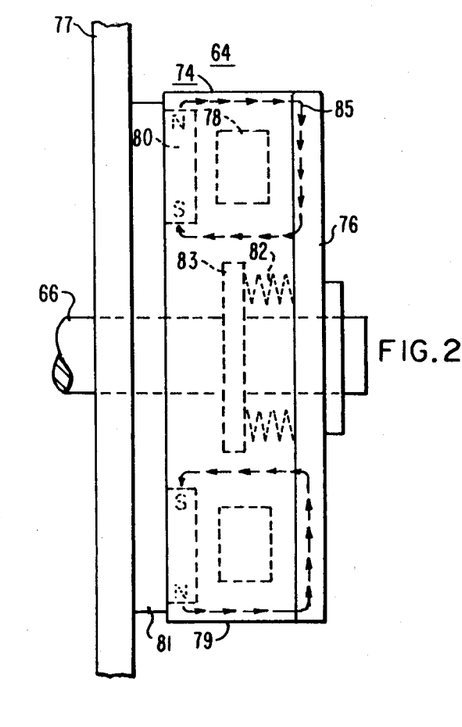
FIG. 2 is a side elevational view of a magnetically set-electrically lifted brake which may be used for the brake shown in the brake controller shown in FIG. 1, with the brake being shown in its set or applied condition.
Figure 3:
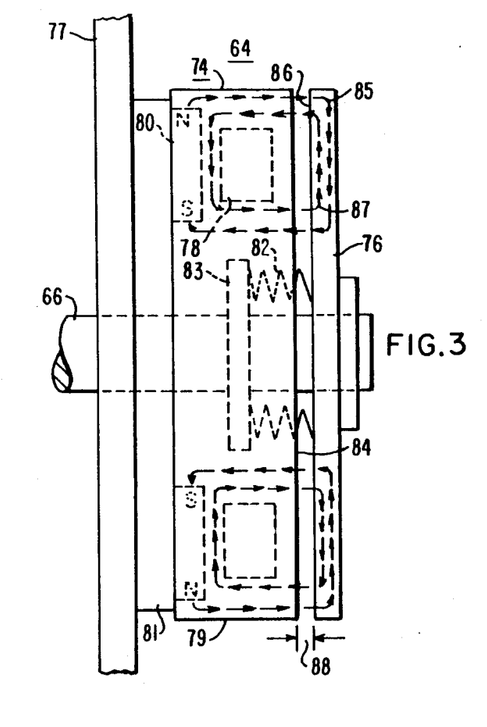
FIG. 3 illustrates the brake shown in FIG. 3 in its lifted or picked condition.
Figure 4:
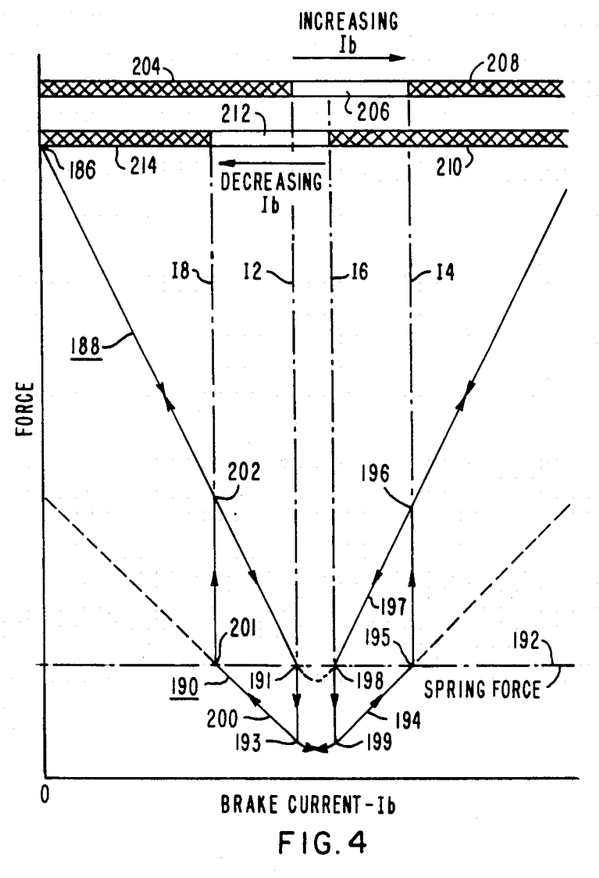
FIG. 4 is a graph which compares braking force versus braking current of a brake such as the brake shown in FIGS. 2 and 3.

Before describing the added functions in detail, the reasons for the added functions will first be described. FIGS. 2 and 3 illustrate a brake 64 which may be used for the brake 64 shown in FIG. 1. FIG. 2 illustrates brake 64 when it is set or applied, and FIG. 3 illustrates brake 64 when it is lifted. Brake 64 includes a brake magnet assembly 74 which is stationary, and an armature 76 which is attached to the shaft to be controlled, i.e., shaft 66 which drives apparatus 10 from a suitable electric motor and speed reducer (not shown). Brake magnet assembly 74 includes a mounting plate 77, a non-magnetic spacer 81, and a housing 79. Housing 79 includes an electromagnetic brake coil 78, a plurality of permanent magnets 80, and a friction surface 84. Armature 76 is essentially a magnetic plate member having a flat surface 86 which, when it contacts surface 84, provides a frictional engagement which develops braking torque in shaft 66. A spring seat 83 is fixed to shaft 66, and a plurality of springs 82 are disposed to exert a biasing force on the armature 76 in a direction which tends to disengage or lift the brake. As shown in FIG. 2, in the absence of current in brake coil 78, magnetic flux 85 provided by permanent magnets 80 follows a flux path which includes housing 79 and armature 76, with the magnetic flux 85 attracting armature 76 towards surface 84 with an attractive force which exceeds the oppositely directed biasing force exerted on the armature 76 by the springs 82. Thus, in the absence of current in brake coil 78, surface 86 of armature 78 is tightly pressed against surface 84, and brake 64 is applied or set, providing maximum braking force. This maximum braking force is illustrated at point 186 in the graph of FIG. 4, with FIG. 4 plotting force on the ordinate and brake current Ib on the abcissa. The substantially V-shaped curve 188 represents the magnetic force when brake 64 is set or applied, and the substantially V-shaped curve 190 represents the magnetic force when brake 64 is lifted.

Initiating current in brake coil 78 produces an electromagnetic field or flux 87 which opposes the magnetic flux 85 provided by the permanent magnets 80. Thus, the flux produced by the brake coil 78 reduces the net flux, it reduces the attractive force provided by the magnets on armature 76, and it reduces the braking torque. Increasing the brake coil current to a value of I2 reduces the magnetic attractive force provided by the resultant flux along curve 188 until the attractive force is equal to the spring force at curve point 191. The spring force is illustrated in FIG. 4 by the horizontal broken line 192. A slight additional increase in the brake coil current then reduces the attractive force below the spring force, and the springs 82 start to move the armature 76 away from the brake magnet assembly 74. This provides an air gap 88 between surfaces 84 and 86 which increases the reluctance of the magnetic path, further reducing the net flux. This is an unstable condition which results in a quick move of armature 76 to the maximum air gap 88, resulting in a vertically downward drop of the attractive force from point 191 on the brake-applied curve 188 to point 193 on the brake-released curve 190.

Further increases in brake coil current result in a change in the direction of the flux, but the absolute value increases as does the net attractive force. If the brake coil current is increased sufficiently along curve portion 194 until curve point 195 is reached at current value I4, the bias spring force is again balanced by the magnetive attractive force and the armature 76 is attracted toward the magnet assembly 74. When this occurs, the reluctance of the magnetic path decreases and causes the net flux to increase. Thus, the armature gap quickly closes to apply braking torque again, and the attractive braking force jumps from point 195 on the brake-released curve 190 to point 196 on the brake-applied curve 188. Normally, the brake coil current is not increased to this high a level, but transient excursions of the brake coil current can and do occur which may either increase or decrease the coil current.

Reducing the brake coil current towards zero from point 196 reduces the magnetic attractive force along curve portion 197 until it reaches the spring force 192 at point 198 and current value I6. The attractive force then quickly drops to point 199 on the brake-released curve 190, as the armature 76 moves away from the brake magnet assembly 74. As the brake coil current continues to reduce, the magnetic attractive force starts to increase along curve portion 200 until curve 190 intersects the spring force curve 192 at point 201 and current value I8, at which time the attractive force jumps to point 202 on the brake applied curve 188.

As shown at the top of FIG. 4, for an increasing brake coil current, the cross-hatched area 204 indicates there is no air gap from zero brake coil current to current value I2, the open area 206 between current values I2 and I4 indicates an air gap, and the cross-hatched area 208 for current values exceeding value I4 again indicates no air gap.

For a decreasing coil current, the cross-hatched area 210 indicates no air gap until the brake coil current value drops to value I6, the open area 212 between current values I6 and I8 indicate an air gap, and the cross-hatched area 214 from current value I8 to current zero again indicates no air gap.

Figure 5:
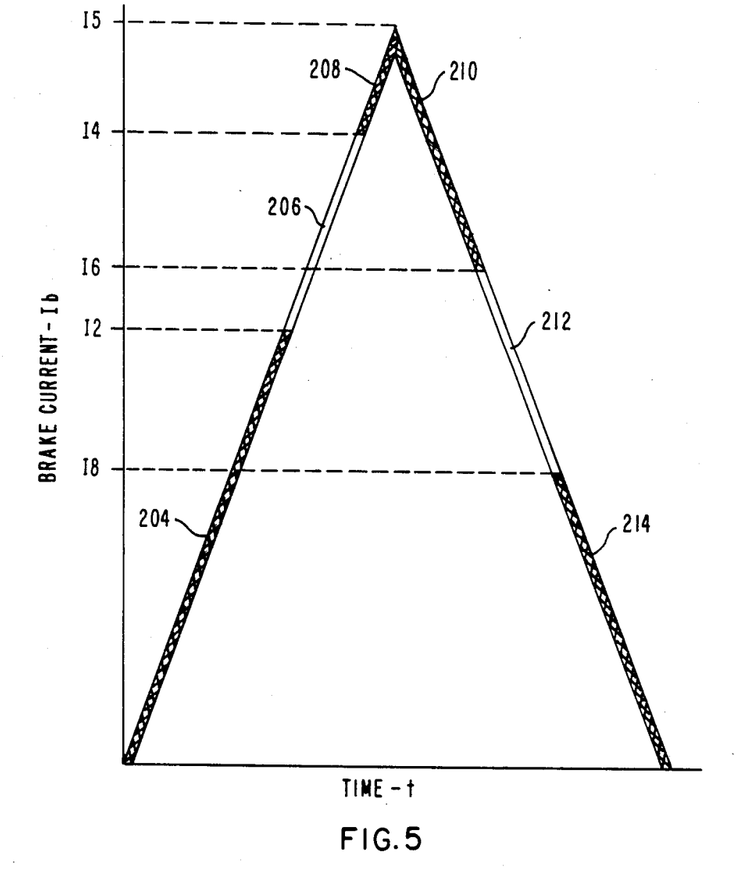
FIG. 5 is a graph which plots brake current versus time, for increasing and decreasing values of brake current, with the non-cross hatched portions indicating brake current values when the brake is fully lifted.

To more clearly indicate the brake coil current hysteresis involved, the brake coil current Ib is plotted on the ordinate in FIG. 5, versus time on the abcissa. It will be noted that only a brake coil current in the relatively narrow range between values I2 and I6 will result in an air gap regardless of whether the brake coil current reached that value while increasing or decreasing. In other words, the brake 64 has first and second overlapping brake current release ranges for increasing and decreasing values, respectively, of brake coil current, with the overlapping portions defining a narrow brake current release window which will cause release of the brake notwithstanding a momentary brake current excursion into a brake setting value outside either brake current release range.

Figure 6:
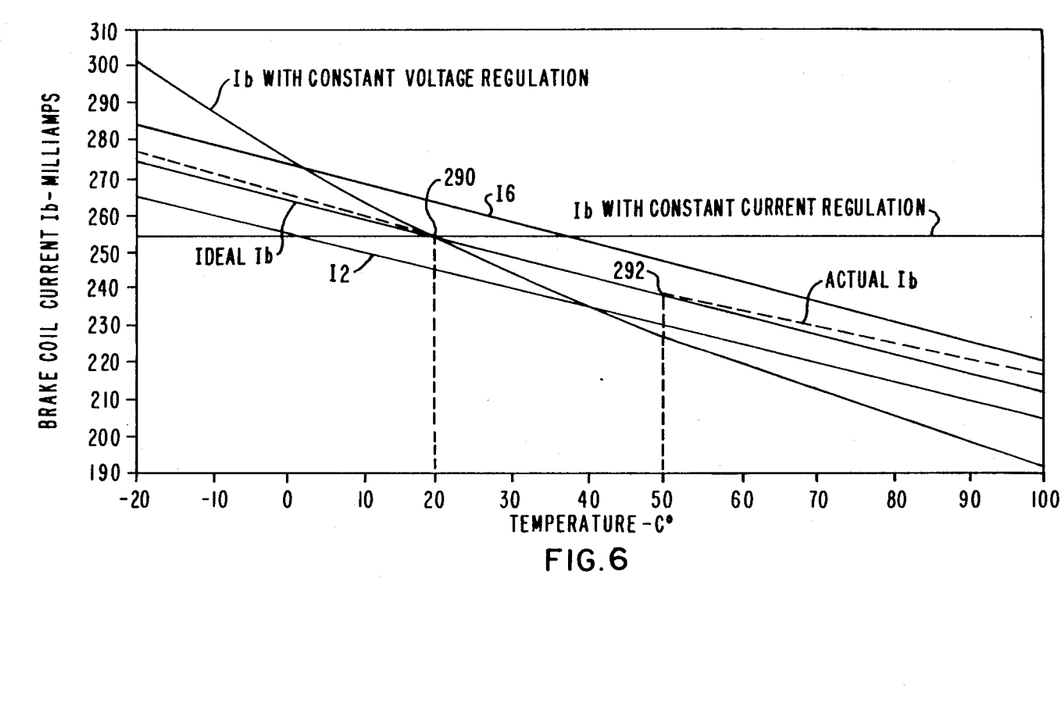
FIG. 6 illustrates brake current values versus temperature for actual brake current Ib for the brake controller shown in FIG. 1, as well as the ideal brake current, the brake current when constant current regulation is used, and the brake current when constant voltage regulation is used.

During normal running of the transportation apparatus 10 it is imperative to always have the brake 64 in the fully released condition. Any rubbing or drag of the armature 76 on the brake magnet assembly 74 will cause excessive wear and/or overheating of the brake 64. Complete lifting of the brake 64 can be achieved while apparatus 10 is running by controlling the brake coil current to always be between current values I2 and I6. However, as the brake temperature changes, so does the value of the magnetic flux provided by the permanent magnets 80. Thus, the values of I2 and I6 which will maintain the brake fully released, regardless of the direction of the brake current when it arrived between values I2 and I6, change with brake operating temperature, such as illustrated in FIG. 6. FIG. 6 illustrates brake current values I2 and I6 and how they decrease with increasing brake operating temperature across the operating temperature range of the brake 64. It will be noted that the ideal brake current is halfway between current values I2 and I6 regardless of brake operating temperature. It will also be noted that maintaining the brake current constant with constant current regulation causes the brake current to be between values I2 and I6 for only a very short temperature range. Thus, to maintain the net flux value at the level which will cause the brake current to be between values I2 and I6, the running brake current level will have to track the changing values of I2 and I6. As will be hereinafter described in detail, this result is achieved by adding a permanent magnet temperature compensation circuit to the brake controller of the incorporated patent.

Figure 7:
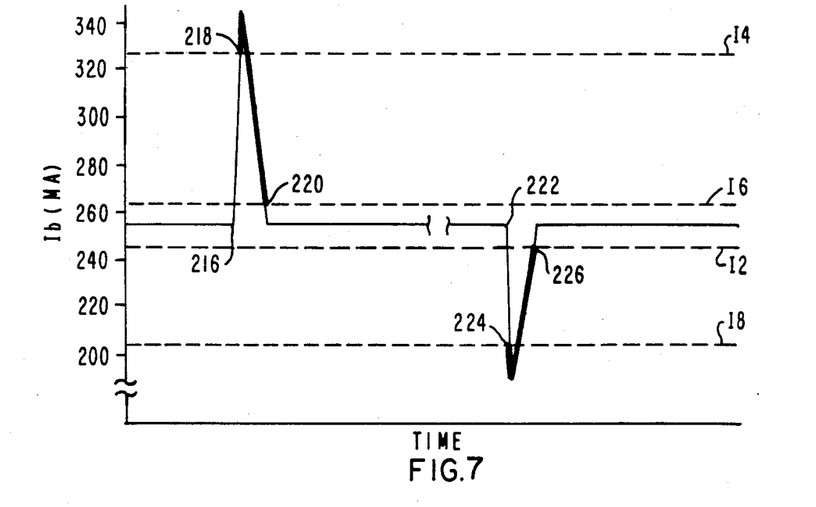
FIGS. 7, 8 and 9 illustrate brake current values and the effect of transient excursions of brake current from different initial starting current values.
Figure 8:
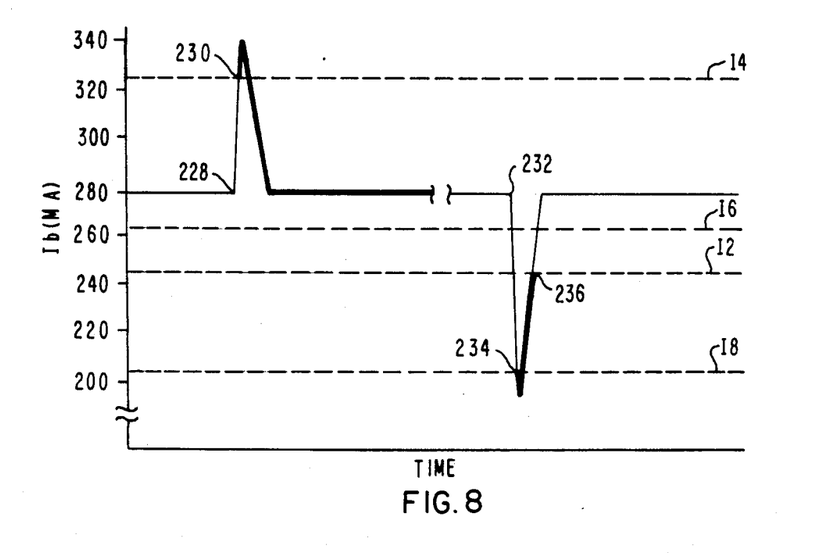
Figure 9:
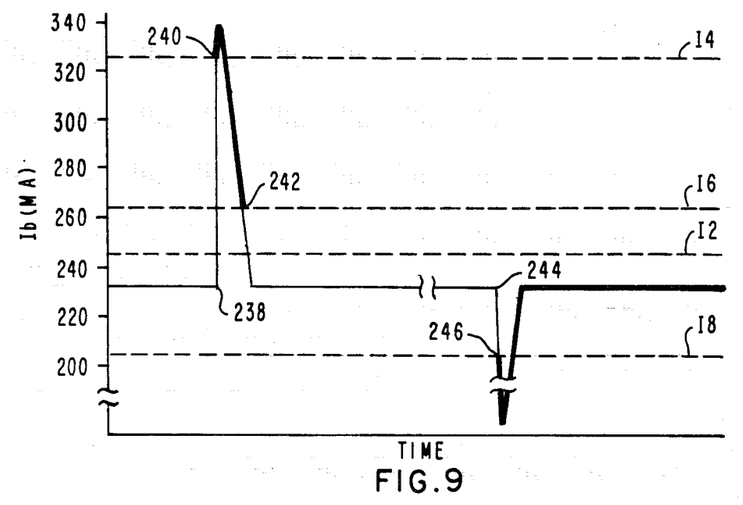

It will be appreciated that the initial adjustment of the temperature compensation circuit is very critical because the range between current values I2 and I6 is relatively narrow. If the adjustment is incorrect, brake rubbing can occur. This is illustrated in FIGS. 7, 8 and 9, which illustrate brake current Ib versus time, with the current values I2, I4, I6 and I8 being illustrated with broken horizontal lines. FIG. 7 illustrates a correct adjustment of the brake current Ib. If a positive going transient at point 216 should cause the brake current to rise above level I4, brake rubbing will occur at point 218 as the brake current level exceeds I4, and it will cease at point 220 when the brake current drops below I6. Brake rubbing is indicated by the heavier portions of the brake current curves.

In like manner, should a momentary drop in brake coil current occur at point 222, such as might be caused by a momentary loss of electrical power, brake rubbing will occur at point 224 as the brake coil current drops below value I8, and it will continue until the brake current rises above level I2 at point 226.

FIG. 8 illustrates the effect of having the brake current adjusted such that it normally exceeds level I6. No brake rubbing will occur until a positive transient at point 228 drives the brake current above value I4, with rubbing starting at point 230. Since the brake current does not fall below the brake release value I6, rubbing will then continue indefinitely. A negative going transient from the adjusted level at point 232 in FIG. 8 will not cause prolonged rubbing, as the rubbing will start at point 234 when the current drops below level I8, and it will cease at point 236 as the current level passes through release level I2.

FIG. 9 illustrates the effect of having the brake current adjusted such that it is normally below level I2, and adjusted to be non-rubbing by first increasing the value above I6. A positive going transient at point 238 will only cause rubbing from points 240 to 242, while a negative going transient at 244 will cause indefinite rubbing, starting at point 246.

The invention effectively widens the brake current release zone, making the adjustment of the temperature tracking circuitry much less critical, by pulsing the brake current during the normal running of the transportation apparatus 10. The pulsing is uniform, raising and lowering the coil current by the same magnitude for the same periods of time, resulting in no change in the average brake coil current. The magnitude of the pulsing is selected to be great enough to drive the brake current through the brake release levels, i.e., above I2 when returning from a negative going transient, and below I6 when returning from a positive going transient. The pulse amplitude should not be great enough, however, to cause the operating current to rise above I4 or drop below I8 for any normal average value of operating current. This solution works well for brakes where the magnitude of the range between I2 and I6 is less than the magnitude of the range between I6 and I4, and less than the magnitude of the range between I2 and I8. This has been found to be true for the brakes tested.

Figure 10:
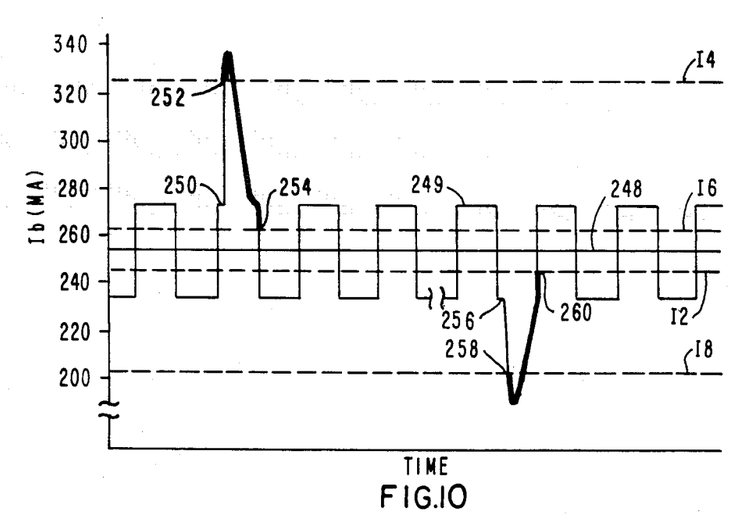
FIGS. 10, 11 and 12 are brake current values similar to those of FIGS. 7, 8 and 9, respectively, except illustrating the effect of transient excursions of brake current when the running brake current is pulsed according to the teachings of the invention.
Figure 11:
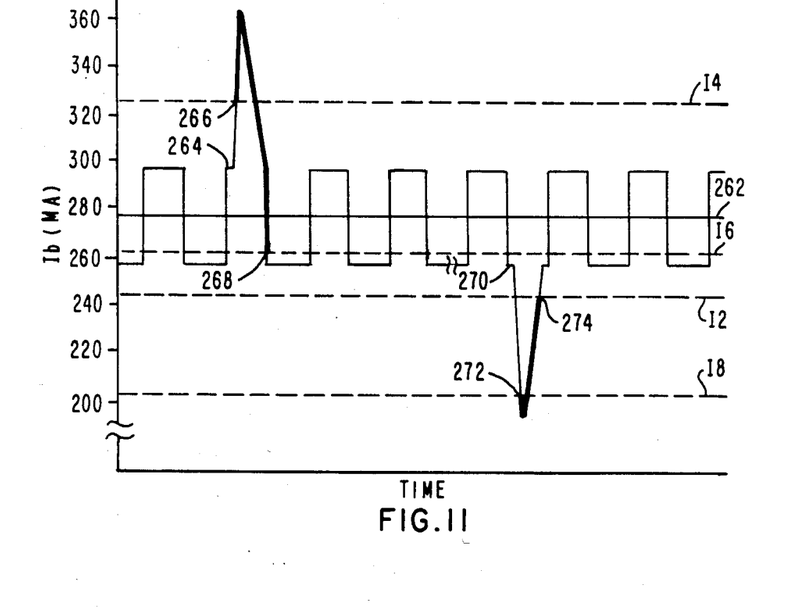
Figure 12:
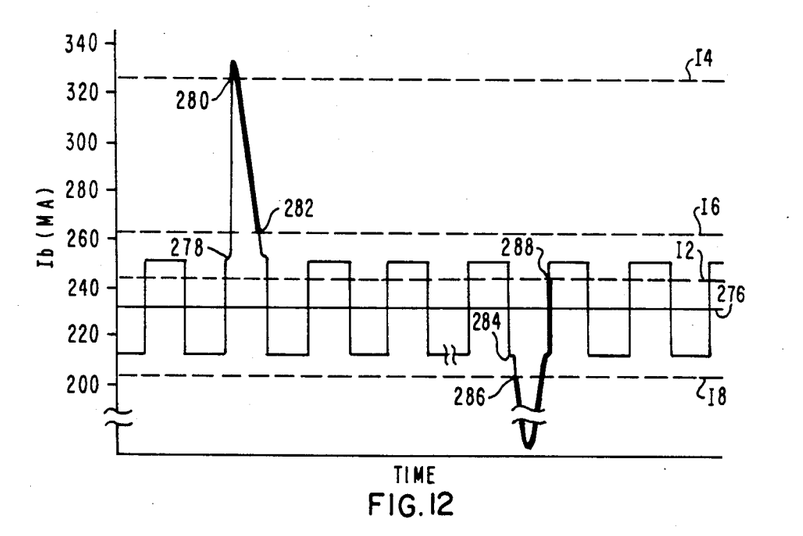

FIGS. 10, 11 and 12 are similar to FIGS. 7, 8 and 9, respectively, except illustrating the effects of adding a pulsing waveform to the operating level of the brake current. In FIG. 10 the average brake current indicated by line 248 is between I2 and I6 and thus the brake will release following a positive or negative transient, with or without the square wave pulsing waveform 249 added to the average current waveform. A positive going transient at 250 initiates brake rubbing at 252 when current level I4 is reached, which persists only until the waveform drops to and crosses release level I6 at 254. A negative going transient at 256 initiates brake rubbing at 258 as the transient crosses level I8, which persists only until release level I2 is crossed at 260.

FIG. 11 illustrates the condition where the average brake current 262 is above level I6. A positive going transient at 264 initiates brake rubbing at 266 as the current passes level I4, and it terminates at 268 as the lower half cycle of the square wave pulse waveform drives the current level through the release level I6. A negative going transient at 270 initiates rubbing at 272 as the current drops through level 272, and it terminates at 274 as the current rises to and passes through release level I2.

FIG. 12 illustrates the condition where the average brake current 276 is below release level I2. A positive going transient at 278 initiates brake rubbing at 280 as the current goes through level I4, with the rubbing terminating at 282 as the current falls through release level I6. A negative going transient at 284 initiates brake rubbing at 286 as the current falls through level I8, and rubbing terminates at 288 as the upper half of the square wave drives the current through release level I2.

Another benefit that is derived from current pulsing is an improvement in initial brake release. The first current pulse is oriented such that the upper half cycle always appears when the brake is to be lifted, driving the brake current immediately to its maximum value, i.e., above level I6. The current is thus driven more quickly above level I2 and the brake releases faster and more positively. With a random pulse initiation, the brake could drag initially if the first pulse happened to be a lower half cycle, as the initial current magnitude would be below release level I2. Without current pulsing, if the operating current is set below I2, the brake would never fully lift.

Figure 13:
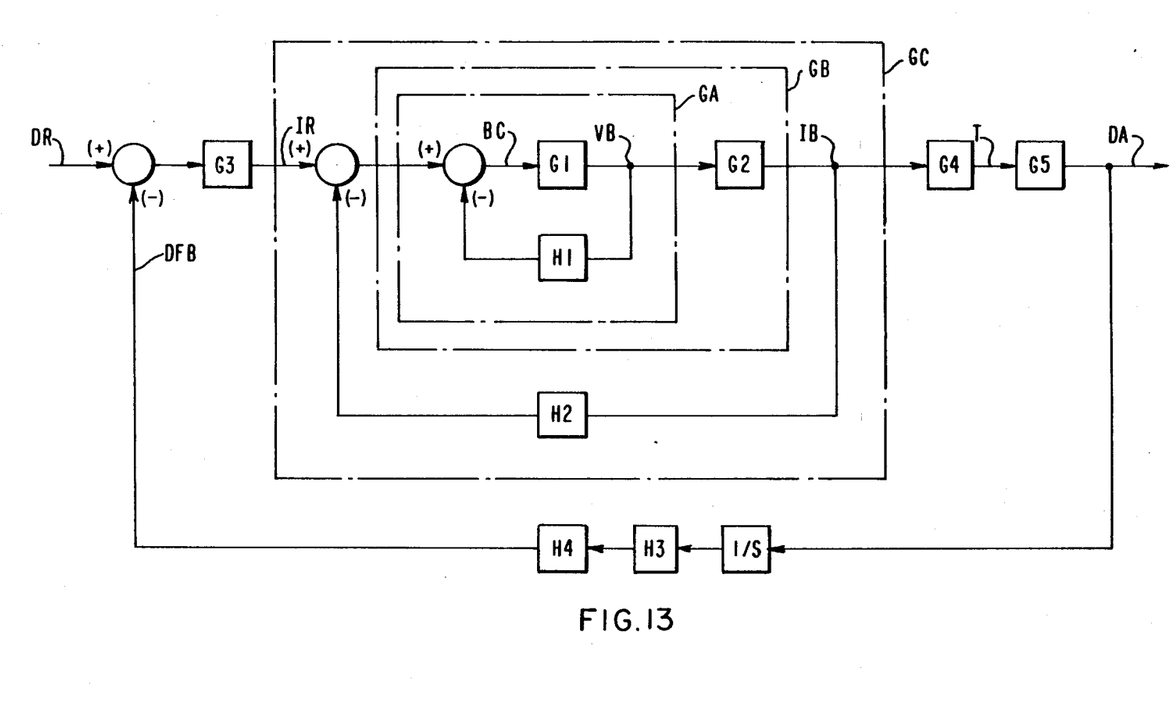
FIG. 13 is block diagram setting forth servo loops utilized in the brake controller of FIG. 1.

FIG. 13 is a block diagram of a servo loop illustrating how the invention implements temperature compensation of the permanent magnets 80. Block H1 represents voltage feedback, and block H2 represents current feedback. In the incorporated patent, only current feedback was used. The voltage feedback H1 is used to cause the brake current to have the correct temperature characteristic. The ratio of the current and voltage feedback is set to cause the brake current to track the temperature dependent change of the permanent magnets. The values of the current and voltage feedback may be determined by different techniques, including trial and error. The following method is a simple, straight forward analytical one.

In the following equations, the brake resistance (ohms) increases by K1 (0.393% per degree C.), the resistance temperature coefficient for copper wire. It is desired to decrease the brake current with increasing brake temperature by K2, the reduction in magnetic flux from the permanent magnets 80 with increasing temperature (0.20% per degree C.). The solution chosen uses equations written for two temperatures in the range of interest, 20 degrees C. and 50 degrees C. Solving the equations produced 0.0648 for H1, 18.0555 for H2 and 160 for G1. The results are also shown in FIG. 6, as the "actual Ib". It will be noted that the "ideal Ib" in FIG. 6 is a straight line from about 274 milliamps at −20 degrees C. to about 214 milliamps at 100 degrees C. The actual brake current, regulated for zero flux regulation according to the exemplary implementation cuts through the ideal Ib at points 290 and 292, at 20 degrees C. and 50 degrees C., respectively, the calculated points. For a temperature range of interest of −20 degrees C. to 70 degrees C., the maximum deviation occurs at −20 degrees C. and is only about 3.5 ma. This corresponds to a deviation of about 1.3%. For comparison, the maximum deviation using constant current regulation is about 10.9% at 70 degrees C. For constant voltage regulation the maximum error occurs at −20 degrees C., and is about 9.9%. Also, for comparison, the values of I6 and I2 are shown in FIG. 6. It will be noted that the actual Ib for zero flux regulation stays well between these limits over the temperature range of −20 degrees C. to 100 degrees C. Permanent magnet temperature compensation is therefor achieved by adding voltage feedback, and changing the value of current feedback to suit the required compensation level.

EQUATIONS FOR DETERMINING H1 AND H2

$G2 = 1/RB$ ($RB$ = resistance of brake)

$GA = G1/(1+G1*H1)$ $GB = GA*G2$ $GC = GB/(1+GB*H2)$ or
$(G1*G2)/(1+G1*H1+G1*G2*H2)$ or $IB/IR$

At Temperature T1:

$RB1 = RB20°(1+K1°(T1-T20))$ $IB1 = IB20°(1-K2*(T1-T20))$ (desired current)

$G2 = G21 = 1/RB1$ $GC = GC1 = (G1*G21)/(1+G1*H1+G1°G21°H2)$ $GC1 = IB1/IR$

At Temperature T2:

$RB2 = RB20°(1+K1°(T2-T20))$ $IB2 = IB20*(1-K2*(T2-T20))$ (desired current)

$G2 = G22 = 1/RB2$ $GC = GC2 = (G1*G22)/(1+G1*H1+G1°G22°H2)$ $GC2 = IB2/IR$

From the above, two simultaneous equations may be written to evaluate H1 and H2:

$$H1 + G21*H2 = G21/GC1 - 1/G1 \quad (1)$$

$$H1 + G22°H2 = G22/GC2 - 1/G1 \quad (2)$$

Rewriting in general terms:

$$M1°H1 + N1*H2 = L1 \quad (1A)$$

$$M2°H1 + N2*H2 = L2 \quad (2A)$$

From which:

$$H1 = (L1*N2 - L2°N1)/(M1°N2 - M2°N1)$$

$$H2 = (M1*L2 - M2°L1)/(M1°N2 - M2°N1)$$

The values for M1, M2, N1, N2, L1 and L2 may be obtained from equations 1 and 2. The values of H1 and H2 obtained from the equations force the brake current to go through the desired current points at temperatures T1 and T2. The changes in brake coil resistance and permanent magnet flux are compensated at T1 and T2.

Figure 14:
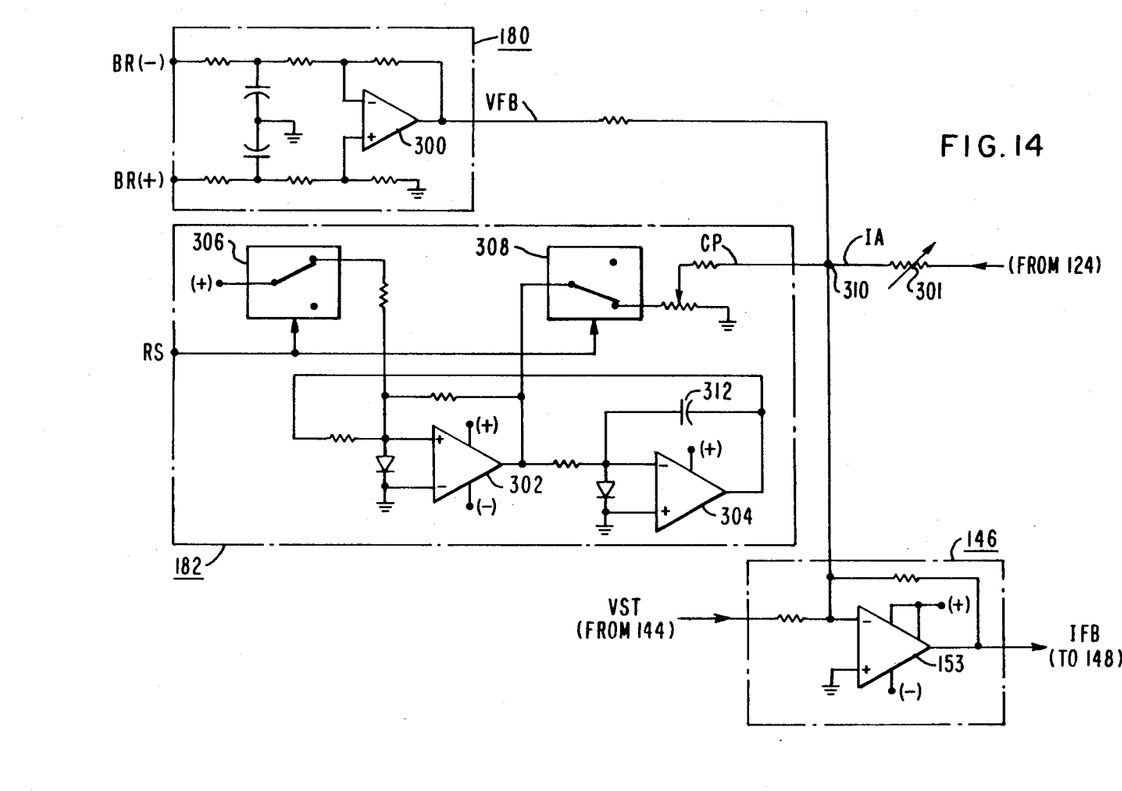
FIG. 14 is a detailed schematic diagram of voltage feedback and brake current pulsing circuits which may be used for those functions shown in block form in FIG. 1.

FIG. 14 is a detailed schematic diagram which illustrates how FIG. 7 of the incorporated patent may be modified according to the teachings of the invention, to incorporate both temperature compensation for the permanent magnets 80 in the brake 64 and the square wave addition to the running brake current waveform. The voltage feedback function 180 is provided by an operational amplifier 300 connected as a conventional differential amplifier. The differential amplifier monitors the voltage across the brake coil 78 and provides a feedback signal VFB. The current feedback IA is adjusted to provide the calculated ratio of current to voltage feedback by proper selection of the value of resistor 301. Resistor 301 is shown as being adjustable, but its value may be calculated and a fixed resistor used to prevent accidental misadjustment.

The square wave pulsing function 182 is provided by operational amplifiers 302 and 304 connected as an astable multivibrator. The output, which is taken from operational amplifier 302, is a square wave having a magnitude of about +/−14 volts and a frequency of about ⅜ Hz. Two solid state switches 306 and 308 are used to control the current pulsing function, such as AD7510DI. The control involves properly orienting the initial pulse to insure maximum brake current when the brake is to be initially lifted, and the termination of the pulsing when a controlled stop is initiated.

More specifically, solid state switches 306 and 308, which are normally closed and normally open, respectively, are controlled by the condition of running relay 2R shown in FIG. 1. When the transportation apparatus 10 is not being driven by its drive motor, such as at the start of a controlled stop, running relay 2R is dropped out, its contact 2R-5 is open, and normally open switch 308 is open, disconnecting the current pulsing waveform CP from junction 310 and mixer 146. Thus, there is no current pulsing from function 182 during the controlled deceleration interval.

When the transportation apparatus is not running, the normally closed switch 306 connects a source of positive unidirectional potential to the astable multivibrator to maintain feedback capacitor 312 of operational amplifier 304 charged to about −14 volts. When transportation apparatus 10 is started, the run contactor 120 energizes relay 2R, contact 2R-5 closes, switch 306 opens and switch 308 closes. Operational amplifier 302 changes state, and the negative portion of the initial pulse is applied to mixer 146 which inverts this to cause the brake current to rise to its highest value on release of the brake. The change in state of operational amplifier 302 causes capacitor 312 to begin charging towards the opposite polarity. At about +5 volts it changes the state of operational amplifier 302, which functions as a Schmitt trigger. The circuit then continues to periodically change state to generate the desired square waveform pulses.

In summary, the present invention improves the operation of transportation apparatus, such as escalators, which have one or more brakes which are controlled to provide a controlled stop. The present invention does not relate to the controlled stop function per se, but to the operation of the brake, or brakes, while the transportation apparatus is running, before the initiation of a controlled stop. The invention adds brake voltage feedback to the brake current feedback of the incorporated patent, with the value of current feedback being selected to provide a ratio of current to voltage feedback which causes the running brake current to closely track the temperature characteristic of the permanent magnets used in the controlled brake. Thus, the desired flux cancellation is maintained over the operating temperature range of the brake. The criticality in the setting of the brake current feedback is greatly alleviated by another aspect of the invention in which a pulsing waveform is added to the running brake current. Thus, the average brake current may be above or below the desired narrow range and the added waveform will still drive the current into the brake release range, to prevent a transient in the brake current from initiating brake dragging for an indefinite period of time. The first pulse is additionally controlled such that the brake current is driven to its maximum value when the brake is lifted to initiate running of the transportation apparatus, to insure a fast, clean brake release with minimal dragging.

I claim as my invention:

1. A method of operating transportation apparatus having a conveyor driven by an electrical motor, an electrically released, magnetically set brake having a brake coil and permanent magnets, and a servo loop for regulating the brake coil current, wherein the brake has hysteresis caused by overlapping first and second brake current release ranges for increasing and decreasing values, respectively, of the brake current, with the overlapping portions defining a narrow brake current release window which will cause release of the brake notwithstanding a momentary brake current excursion into a brake setting value outside either brake current release range, and wherein the brake coil and permanent magnets have temperature dependent characteristics which cause the upper and lower limits of the narrow brake current release window to shift with brake temperature, the improvement comprising:
   compensating for the temperature characteristic of the brake while the electrical motor is driving the conveyor to cause the regulated brake coil current to change with the shifting brake current window,
   said compensating step including the steps of:
   providing both brake voltage feedback and brake current feedback for the servo loop,
   and selecting the values of the brake voltage feedback and brake current feedback to cause the electromagnetic flux provided by the brake current to substantially cancel the permanent magnet flux over the operating temperature range of the brake.

2. The method of claim 1 wherein the selecting step selects the values of the brake voltage feedback and brake current feedback to cause the average brake current to operate within the narrow brake current release window.

3. The method of claim 1 including the step of continuously pulsing the brake current while the electric motor is driving the conveyor to enable the average value of the regulated brake current to operate outside the narrow brake current release window, without transient excursions of the brake current initiating and sustaining partial setting of the brake due to the brake current hysteresis, when the average value of the brake current is sufficiently close to the brake current release window that a brake current pulse will enter the brake current release window following such an excursion.

4. The method of claim 3 including the step of orienting the first brake current pulse upon initial start-up of the conveyor to cause the brake current to rise to its maximum value, insuring immediate brake release.

5. A method of operating transportation apparatus having a conveyor driven by an electrical motor, an electrically released, magnetically set brake having a brake coil, and a servo loop for regulating brake coil current to a desired regulated value wherein the brake has hysteresis caused by overlapping first and second brake current release ranges for increasing and decreasing values, respectively, of the brake current, with the overlapping portions defining a narrow brake current release window which will cause release of the brake notwithstanding a momentary brake current excursion into a brake setting value outside either brake current release range, the improvement comprising:
   continuously pulsing the brake current while the electric motor is driving the conveyor to enable the average value of the regulated brake current to operate outside the narrow brake current release window, without transient excrusions of the brake current initiating and sustaining partial setting of the brake due to the brake current hysteresis, when the average value of the brake current is sufficiently close to the brake current release window that a brake current pulse will enter the narrow brake current release window following such an excursion.

6. The method of claim 5 including the step of orienting the first brake current pulse upon initial start-up of the conveyor to cause the brake current to rise to its maximum value, insuring immediate brake release.

7. The method of claim 5 wherein the pulsing step uniformly increases and decreases the brake current such that the average value of the pulsed brake current is the same as the desired regulated value.

8. In transportation apparatus having a conveyor driven by an electrical motor, an electrically released, magnetically set brake having a brake coil and permanent magnets, and a servo loop for regulating the brake coil current, wherein the brake has hysteresis caused by overlapping first and second brake current release ranges for increasing and decreasing values, respectively, of the brake current, with the overlapping portions defining a narrow brake current release window which will cause release of the brake notwithstanding a momentary brake current excursion into a brake setting value outside either brake current release range, and wherein the brake coil and permanent magnets have temperature dependent characteristics which cause the upper and lower limits of the narrow brake current release window to shift with brake temperature, the improvement comprising:

means for compensating the servo loop for the temperature characteristic of the brake while the electrical motor is driving the conveyor to cause the regulated brake coil current to change with the shifting brake current window, said compensating means including means for providing brake voltage feedback and means for providing brake current feedback, with the values of the brake voltage feedback and the brake current feedback being selected to cause the electromagnetic flux provided by the brake current to substantially cancel the permanent magnet flux over the operating temperature range of the brake.

9. The transportation apparatus of claim 8 wherein the values of the brake voltage feedback and brake current feedback are selected to cause the average brake current to operate within the narrow brake current release window.

10. The transportation apparatus of claim 8 including means for continuously pulsing the brake current while the electric motor is driving the conveyor, to enable the average value of the regulated brake coil current to operate outside the narrow brake current release window, without transient excursions of the brake current initiating and sustaining partial settting of the brake due to the brake current hysteresis, when the average value of the brake current is sufficiently close to the brake current release window that a brake current pulse will enter the brake current release window following such an excursion.

11. The transportation apparatus of claim 10 including means for orienting the first brake current pulse upon initial start-up of the conveyor to cause the brake current to rise to its maximum value, insuring immediate brake release.

12. In transportation apparatus having a conveyor driven by an electrical motor, and an electrically released, magnetically set brake having a brake coil, and a servo loop for regulating brake coil current to a desired regulated value, wherein the brake has hysteresis caused by overlapping first and second brake current release ranges for increasing and decreasing values, respectively, of the brake current, with the overlapping portions defining a narrow brake current release window which will cause release of the brake notwithstanding a momentary brake current excursion into a brake setting value outside either brake current release range, the improvement comprising:

means for continuously pulsing the brake current while the electric motor is driving the conveyor to enable the average value of the regulated brake current to operate outside the narrow brake current release window, without transient excursions of the brake current initiating and sustaining partial setting of the brake due to the brake current hysteresis, when the average value of the brake current is sufficiently close to the brake current release window that a brake current pulse will enter the narrow brake current release window following such an excursion.

13. The transportation apparatus of claim 12 including means for orienting the first brake current pulse upon initial start-up of the conveyor to cause the brake current to rise to its maximum value, insuring immediate brake release.

14. The transportation apparatus of claim 12 wherein the pulsing means uniformly increases and decreases the brake current such that the average value of the pulsed brake current is the same as the desired regulated value.

* * * * *